(12) United States Patent
Plihal

(10) Patent No.: US 9,430,743 B2
(45) Date of Patent: Aug. 30, 2016

(54) COMPOSITE DEFECT CLASSIFIER

(71) Applicant: KLA-Tencor Corporation, Milpitas, CA (US)

(72) Inventor: Martin Plihal, Pleasanton, CA (US)

(73) Assignee: KLA-Tencor Corp., Milpitas, CA (US)

( * ) Notice: Subject to any disclaimer, the term of this patent is extended or adjusted under 35 U.S.C. 154(b) by 0 days.

(21) Appl. No.: 14/637,242

(22) Filed: Mar. 3, 2015

(65) Prior Publication Data
US 2015/0254832 A1    Sep. 10, 2015

Related U.S. Application Data

(60) Provisional application No. 61/949,031, filed on Mar. 6, 2014.

(51) Int. Cl.
*G06T 7/00* (2006.01)
*G06N 99/00* (2010.01)
*G06N 5/02* (2006.01)

(52) U.S. Cl.
CPC ............ *G06N 99/005* (2013.01); *G06T 7/001* (2013.01); *G06N 5/025* (2013.01); *G06T 2207/10061* (2013.01); *G06T 2207/20081* (2013.01); *G06T 2207/30148* (2013.01)

(58) Field of Classification Search
CPC ................... G06T 2207/30148; G06T 7/001; G06T 2207/10061; G06T 2207/20081; G06T 7/0002; G06K 9/6292; G06K 9/628; G06K 9/6282; G06K 9/6857; G01N 21/9501; G01N 21/956; G03F 7/7065; G03F 1/84; G06N 99/005
See application file for complete search history.

(56) References Cited

U.S. PATENT DOCUMENTS 5,544,256 A    8/1996    Brecher et al.
6,092,059 A *  7/2000    Straforini ............ G06K 9/6292
                                                                706/10
6,999,614 B1   2/2006    Bakker et al.
(Continued)

FOREIGN PATENT DOCUMENTS

EP    1 061 571        12/2000
JP    2011-254084      12/2011
KR    10-1296532        8/2013

OTHER PUBLICATIONS

Breiman, "Bagging Predictors," Machine Learning, 24, 123-140 (1996).
(Continued)

*Primary Examiner* — Kim Vu
*Assistant Examiner* — Michael Vanchy, Jr.
(74) *Attorney, Agent, or Firm* — Ann Marie Mewherter

(57) ABSTRACT

Methods and systems for classifying defects detected on a wafer are provided. One method includes inputting information for defects detected on a wafer into each of at least two defect classifiers included in a composite defect classifier. Such a method also includes, for at least one of the defects that is assigned to two or more bins in the composite defect classifier, determining a bin for the at least one of the defects based on a rank assigned to the two or more bins. The rank is assigned to the two or more bins based on one or more characteristics determined for the two or more bins, and the one or more characteristics are determined based on a comparison of predetermined defect classifications for defects in a training set and defect classifications determined for the defects in the training set by the at least two defect classifiers.

30 Claims, 5 Drawing Sheets

(56) References Cited

U.S. PATENT DOCUMENTS

| | | |
|---|---|---|
| 7,359,544 B2 | 4/2008 | Gao et al. |
| 7,873,205 B2 | 1/2011 | Okuda et al. |
| 8,315,453 B2 | 11/2012 | Shlain et al. |
| 2006/0078188 A1 | 4/2006 | Kurihara et al. |
| 2006/0291714 A1 | 12/2006 | Wu et al. |
| 2008/0075352 A1* | 3/2008 | Shibuya ............ G01N 21/9501 382/141 |
| 2011/0268345 A1 | 11/2011 | Nakagaki et al. |
| 2013/0279794 A1 | 10/2013 | Greenberg et al. |
| 2013/0279796 A1 | 10/2013 | Kaizerman et al. |

OTHER PUBLICATIONS

International Search Report and Written Opinion for PCT/US2015/018798 mailed May 29, 2015.

Jain et al., "Statistical Pattern Recognition: A Review," IEEE Transactions on Pattern Analysis and Machine Intelligence, vol. 22, No. 1, pp. 4-37, Jan. 2000.

Kuncheva, "Combining Pattern Classifiers," John Wiley & Sons, Inc., Hoboken, New Jersey, 360 pages, 2004.

Tobin et al., "Adaptation of the Fuzzy K-Nearest Neighbor Classifier for Manufacturing Automation," Proc. SPIE 3306, Machine Vision Applications in Industrial Inspection VI, 122 (Feb. 13, 1998), 9 pages.

\* cited by examiner

COMPOSITE DEFECT CLASSIFIER

BACKGROUND OVINE INVENTION

1. Field of the Invention

This invention generally relates to methods and systems for classifying defects detected on a wafer.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor water. Additional examples of semiconductor fabrication processes include, but are not limited to, chemical-mechanical polishing, etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers. Inspection processes have always been an important part of fabricating semiconductor devices such as integrated circuits. However, as the dimensions of semiconductor devices decrease, inspection processes become even more important to the successful manufacture of acceptable semiconductor devices. For instance, as the dimensions of semiconductor devices decrease, detection of defects of decreasing size has become necessary since even relatively small defects may cause unwanted aberrations in the semiconductor devices.

Automatic defect classification (ADC) of semiconductor defects is an important application of wafer inspection and defect review tools. The most popular and most trusted defect classifiers and nuisance filters used during wafer inspection are manually created decision trees. By far, the most common method for creating defect classification trees is a manual approach with several ease-of-use features such as the ability to copy and paste sub-trees, etc.

Combination of defect classifiers for datasets with complex decision boundaries has been the source of intense study over the last two decades, and extensive literature exists on this topic. Many different combination schemes have been considered, including: (a) data level combination, (b) feature level combination (different feature spaces), (c) classifier combination (fixed classifiers with trainable combination rules, trainable classifiers with fixed combination rules, etc.), etc. In addition, the ability to sequence nuisance filters is available. However, sequencing nuisance filters is just a simple consecutive execution of independent classifiers without attempting to enhance performance by combining their strengths (e.g., the worst performing nuisance bin from the set of nuisance filters will remove the most defects of interest (DOIs)).

Accordingly, it would be advantageous to develop systems and/or methods for classifying defects detected on a wafer that can provide improved defect classification compared to the currently used methods and systems.

SUMMARY OF THE INVENTION

The following description of various embodiments is not to be construed in any way as limiting the subject matter of the appended claims.

One embodiment relates to a computer-implemented method for classifying defects detected on a wafer. The method includes acquiring a training set of data for defects detected on a training wafer and defect classifications determined for the defects in the training set. The method also includes performing two or more defect classification processes by inputting the training set of data into two or more defect classifiers and comparing defect classification results produced by the two or more defect classifiers to the defect classifications determined for the defects in the training set. In addition, the method includes determining one or more characteristics of one or more bins in the two or more defect classifiers based on results of the comparing step and assigning a rank to the one or more bins in the two or more defect classifiers based on the determined one or more characteristics. The method further includes selecting at least two of the two or more defect classifiers to be included in a composite defect classifier based on the rank assigned to the one or more bins and acquiring inspection results for the wafer using an inspection system. The inspection results include information for defects detected on the wafer. The method also includes classifying the defects detected on the wafer by inputting the information for the defects detected on the wafer into each of the at least two defect classifiers selected to be included in the composite defect classifier and, for at least one of the defects that is assigned to two or more bins in the composite defect classifier, determining a bin for the at least one of the defects based on the rank assigned to the two or more bins. The acquiring the training set step, the performing step, the comparing step, the determining step, the assigning step, the selecting step, the acquiring the inspection results step, and the classifying step are performed by a computer system.

The method described above may be performed as described further herein. In addition, the method described above may include any other step(s) of any other method(s) described herein. Furthermore, the method described above may be performed by any of the systems described herein.

Another embodiment relates to another computer-implemented method for classifying defects detected on a wafer. This method includes acquiring inspection results for the wafer using an inspection system. The inspection results include information for defects detected on the wafer. This method also includes classifying the defects detected on the wafer by inputting the information for the defects detected on the wafer into each of at least two defect classifiers included in a composite defect classifier and, for at least one of the defects that is assigned to two or more bins in the composite defect classifier, determining a bin for the at least one of the defects based on a rank assigned to the two or more bins. The rank is assigned to the two or more bins based on one or more characteristics determined for the two or more bins. The one or more characteristics are determined based on a comparison of predetermined defect classifications for defects in a training set and defect classifications determined for the defects in the training set by the at least two defect classifiers. The acquiring and classifying steps are performed by a computer system.

The method described above may be performed as described further herein. In is addition, the method described above may include any other step(s) of any other method(s) described herein. Furthermore, the method described above may be performed by any of the systems described herein.

An additional embodiment relates to a non-transitory computer-readable medium storing program instructions executable on a computer system for performing a computer-implemented method for classifying defects detected on a wafer. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

An additional embodiment relates to a system configured to classify defects detected on a wafer. The system includes an inspection subsystem configured to acquire inspection results for the wafer. The inspection results include information for defects detected on the wafer. The system also includes a computer subsystem configured for performing the acquiring a training set of data step, the performing step, the comparing step, the determining step, the assigning step, the selecting step, and the classifying step of the method described above. The system may be further configured as described herein.

BRIEF DESCRIPTION OF THE DRAWINGS

Other objects and advantages of the invention will become apparent upon reading the following detailed description and upon reference to the accompanying drawings in which.

Figure 1:
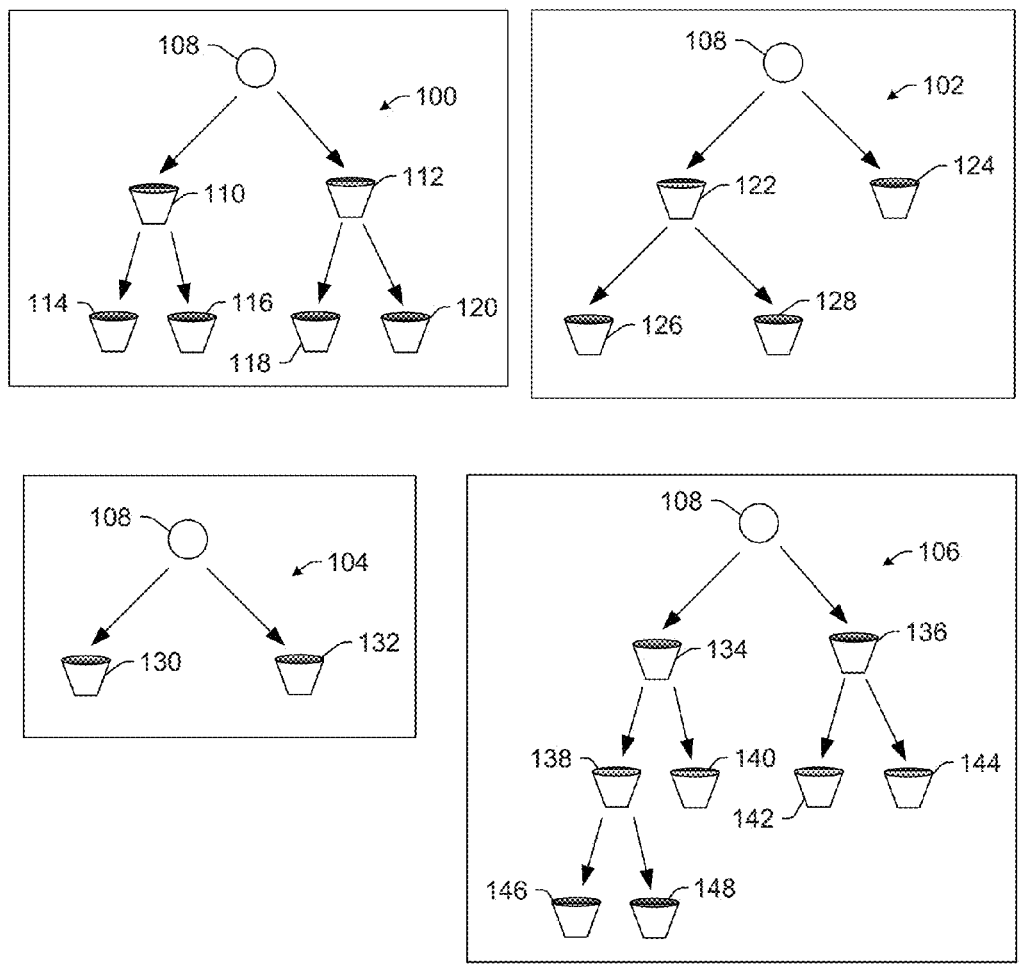
FIG. 1 is a schematic diagram illustrating examples of two or more defect classifiers that can be used in the embodiments described herein.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

One embodiment relates to a computer-implemented method for classifying defects detected on a wafer. The embodiments described herein provide a new classifier training method that leverages the outcome of potentially diverse and partial training objectives to produce more accurate and robust classifiers. The embodiments described herein will be described with respect to classification and regression tree (CART)-type classifiers, which enjoy significant adoption in wafer inspection analysis, but the embodiments described herein can be used with any type of defect classifiers, for which one or more characteristics such as purity and stability of each bin in the classifiers can be estimated. In addition, although the embodiments described herein are described with respect to only one type of defect classifier, the composite defect classifiers described further herein may include more than one type of defect classifier.

The embodiments described herein are based on an observation made during characterization of methods and systems used for generating multiple decision tree-type classifiers with different discrimination thresholds, e.g., classifiers with different nuisance rates. In particular, it was noted that a portion of the decision trees, e.g., a particular bin, could produce substantially good defect of interest (DOI)-nuisance separation while other portions of the classifiers are less useful. In addition, it was noted that in different trees, even with similar nuisance rates, different sub-populations get classified "well." For example, classifiers that have defect populations with relatively low nuisance rates as input tend to have a few substantially pure DOI bins, while their nuisance bins are quite polluted with non-nuisances. Classifiers whose defect population input has relatively high nuisance rates tend to have the opposite behavior. It, therefore, seems promising to pursue the effort of combining the "good" portions of various classifiers to achieve better and more robust defect type separation, and the embodiments described herein can be used to perform such combining.

The method includes acquiring a training set of data for defects detected on a training wafer and defect classifications determined for the defects in the training set The training wafer may include any suitable training wafer used in the art. The method for selecting the training set is very important for the training and performance of any classifier. In general, the training set should be as representative of the overall population as possible. Generating the training set of data for the defects detected on the training wafer may include performing an inspection process on the training wafer and then classifying the defects using some sort of defect review tool or method. For example, the defects could be classified by imaging the detects on the training wafer with a defect review tool (e.g., a scanning electron microscope (SEM)) and receiving defect classification information from a user based on the images. In this manner, the defect classifications for the defects in the training set may be what is commonly referred to as "ground truth" data. The training set of data may include any other data or information generated for the defects by the inspection process (and any defect review process) performed on the training wafer.

In one embodiment, the defects in the training set include DOIs and nuisances. For example, the training set of data preferably includes both DOIs and nuisances such that the defect classifiers can be evaluated as described further herein based on their ability to correctly classify both DOIs and nuisances. The DOIs may include any types of DOIs known in the art, and the nuisances may include any types of nuisances known in the art. In other words, the embodiments described herein are not limited in the types of defects that can be used to evaluate the defect classifiers and that can be classified by the classifiers generated as described herein. In addition, the training wafer is not limited in the type of wafer that it is. In other words, the embodiments described herein may be used to generate and use defect classifiers for any type of wafers known in the art.

The method also includes performing two or more defect classification processes by inputting the training set of data into two or more defect classifiers. Inputting the training set of data into the two or more defect classifiers may be performed in any suitable manner known in the art. The two or more defect classifiers used in this step may be created in any suitable manner known in the art. In addition, creating the two or more defect classifiers can be performed manually or with the help of auto-tuning engines. Therefore, the embodiments described herein may be configured to acquire the output of auto-tuning engines and may have access to the same training data on which the classifiers were trained. The two or more defect classifiers may include a number of classifiers with different discrimination thresholds.

In one embodiment, the method includes tuning at least one of the two or more defect classifiers, prior to assigning a rank to one or more bins in the two or more defect classifiers as described further herein, using a set of modified Bayesian priors to produce a plot illustrating performance of the at least one defect classifier. For example, the methods described herein may include tuning (auto-constructing) of the individual classifiers using a set of modified Bayesian priors that produce a Receiver operating characteristic (ROC) curve. Different priors produce classifiers with different levels of nuisance rates in the DOI bins, which is a way of generating multiple solutions (classifiers) that target different purity/separation characteristics. In addition, the two or more defect classifiers may be generated with auto-tuning approaches based on varying discrimination thresholds (varying nuisance rate targets or varying Elayesian priors). The two or more defect classifiers could also be manually constructed with the goal of separating reliably specific sub-populations of Dais and nuisances. For example, the defect classifiers may be nearest neighbor or linear (non-linear) discriminant classifiers trained to separate one DOI at a time. Training classifiers one DOI at a time may be performed in any suitable manner known in the art, possibly by using some existing products that are commercially available from KLA-Tencor, Milpitas, Calif.

The two or more defect classifiers used to perform the two or more defect classification processes may include any and all of the defect classifiers that are available is at the time the method is performed. However, the two or more defect classifiers evaluated in the method as described herein may be reduced in number in some manner for the purposes of efficiency. For example, if a known defect classifier is not configured to classify any of the DOIs included in the training set of defects, then it may not be used in the embodiments described herein. The opposite may also be true. Any defect classifier known at the time the method is performed and that is configured to classify at least one of the DOIs included in the training set of defects may be used in the embodiments described herein. In addition, the defect classifiers used in the embodiments described herein may include only pre-existing classifiers, only classifiers that were not in existence prior to performing the method and therefore were created by the method as described herein, one or more pre-existing classifiers that are modified (e.g., tuned) in some manner by the embodiments described herein, or some combination thereof. In other words, the embodiments described herein may or may not include creating and/or modifying one or more individual classifiers that are used in the embodiments described herein.

Although the individual defect classifiers used in the embodiments described herein may be generated in any suitable manner, one particularly useful way of generating the individual classifiers will now be described. This method may include providing or acquiring a list of defect attributes to be used for the tree creation. The list of defect attributes may be acquired or generated in any suitable manner. For example, a user may input the list of defect attributes manually. In another example, the list of defect attributes may be determined based on the defect attributes of the defects included in the training set.

At each level of each of the individual classifiers, the method may look for the attribute that provides the best separation at that level, and the attribute may be inserted with the outline that provides this best separation. What constitutes the best separation is influenced by the Bayesian priors, and thus different priors will produce different trees. The priors may also be assigned to each defect type even if the ultimate interest of the is classification is binary classification, i.e., nuisance versus DOI.

The construction of a tree may then be terminated when a certain level of improvement from one level to the next is not achieved. This concludes the construction of one tree. Each leaf node of the individual classifiers can carry a label "nuisance" or "DOI" depending on which type from the training set is the majority of the defect subpopulation in the bin.

Alternative construction methods that can be used in the embodiments described herein involve randomization of attribute selection and/or different stopping criteria.

In one embodiment, performing the defect classification processes includes tuning the two or more defect classifiers based on the defect classifications determined for the defects in the training set. Therefore, the embodiments described herein may include a classifier training (tuning) step. There are a multitude of ways in which the two or more defect classifiers can be trained. For example, during training, several classifiers can be tuned for particular goals. This tuning can be a manual process of building a classifier to separate a particular sub-population of defects from the rest or more likely could be a semi-automatic tuning process, which may include any such tuning process known in the art. In addition, results of the comparing step described herein (in which the defect classification results of a classifier are compared to the defect classifications determined for the defects in the training set) may be used to alter one or more parameters of the classifier such that the defect classification results produced by the classifier match the predetermined defect classifications as closely as possible thereby tuning the classifier. Furthermore, the two or more defect classifiers used in the embodiments described herein may be produced by any existing tuning methods. Therefore, the two or more defect classifiers that are used in the methods described herein may be created by the methods described herein. However, the defect classifiers that are used in the methods described herein may be created by some other system and method and then acquired by the embodiments described herein. In addition, the defect classifiers that are used in the methods described herein may include any and/or all defect classifiers that exist at the time the methods described herein are performed.

FIG. 1 illustrates examples of a number of different classifiers that can be used in the embodiments described herein. For example, the defect classifiers may include classifiers 100, 102, 104, and 106. As shown in FIG. 1, each of the defect classifiers has a different decision tree structure than each of the other defect classifiers. However, two or more of the defect classifiers can have the same decision tree structure but different parameters (cutlines) between bins. In addition, defect classifiers that have the same decision tree structures can be configured to use different combinations of defect attributes for the separation of the defects. The defect attributes used by the defect classifiers described herein may include any suitable defect attributes such as magnitude, polarity, gray level, reference roughness, energy, and the like that can be determined by a water inspection tool during a wafer inspection process.

As further shown in FIG. 1, defect classifier 100 may separate defect population input 108 into bins 110 and 112. The defect classifier may then separate the defect subpopulation in bin 110 into bins 114 and 116. In addition, the defect classifier may separate the defect subpopulation in bin 112 into bins 118 and 120. Some of bins 114, 116, 118, and 120 may be DOI bins and others of the bins may be nuisance bins.

As further shown in FIG. 1, defect classifier 102 may separate defect population input 108 into bins 122 and 124. The defect classifier may then separate the defect subpopulation in bin 122 into bins 126 and 128. Some of bins 124, 126, and 128 may be DOI bins and others of the bins may be nuisance bins.

In addition, defect classifier 104 may separate defect population input 108 into bins 130 and 132, with no further separation of the subpopulations in bins 130 and 132. Therefore, defect classifier 104 represents the simplest possible version of a decision tree-based classifier. One of bins 130 and 132 may be a DOI bin and the other of bins 130 and 132 may be a nuisance bin.

is As further shown in FIG. 1, defect classifier 106 may separate defect population input 108 into bins 134 and 136. The defect classifier may then separate the defect subpopulation in bin 134 into bins 138 and 140. In addition, the defect classifier may separate the defect subpopulation in bin 136 into bins 142 and 144. The defect classifier may further separate the defect subpopulation in bin 138 into bins 146 and 148. Some of bins 140, 142, 144, 146, and 148 may be DOI bins and others of the bins may be nuisance bins.

As can be seen from FIG. 1, therefore, defects in the same population may be separated into a number of different bins by different classifiers. As such, a defect in the population may be assigned different classifications by different classifiers. As described above, the defect classifiers may include some number of DOI bins (e.g., at least one DOI bin) and some number of nuisance bins (at least one nuisance bin). In some instances, all of the DOI bin(s) in any one defect classifier may be for the same type of DOI. Such defect classifiers may be used when the objective of defect classification is the binary classification use case, i.e., nuisance filtering. However, the embodiments described herein may be extended to multi-DOI class classification. In such embodiments, one or more of the defect classifiers may be configured to have multiple DOI bins for different DOI types such that different types of DOI can be separated into different bins in the same tree.

The method further includes comparing defect classification results produced by the two or more defect classifiers to the defect classifications determined for the defects in the training set. For example, for any one defect in the training set, the comparing step may compare the defect classification assigned to the defect by all of the two or more defect classifiers (e.g., in the example of FIG. 1, defect classifiers 100, 102, 104, and 106) to the defect classification for the defect included in the training set. The output of the comparing step may therefore include some information about whether each of the defect classifiers assigned the correct defect classification (the classification in the training set) to each of the defects. Whether or not a classifier assigns the correct classification to a defect can be used as described further herein to determine information about the classifiers.

The method also includes determining one or more characteristics of one or more bins in the two or more defect classifiers based on results of the comparing step. The method, therefore, analyzes multiple decision trees on training set(s) of data. In other words, the method may analyze multiple defect classifiers by determining characteristic(s) of bins that is/are based on whether defects have been assigned to the correct bin by the classifiers. This step may be performed in a number of different manners based on a number of different characteristics as described further herein.

In some embodiments, the training set of data that is input into the two or more defect classifiers to perform the two or more defect classification processes may include the whole training set of data. However, in some instances, only a portion of the training set of data may be input into the two or more defect classifiers. The training set of data may be split up in this manner for cross-validation purposes. For example, cross-validation refers to a method in which a training set is split into a group of defects that are actually trained on and a different group on which the training is evaluated. In one such example, the training set may be split into 10 disjoint randomly selected sets of roughly the same number of defects (about 10% of the total training set) covering the entire training set. Then, for each of the 10 sets, we will use the other 90% of the training set for training and the smaller test set (about 10% of the training set) for validation of the trained model.

In some such instances, the method may include training using different portions of about 90% of the training data set, and then assessing one or more characteristics such as stability and purity of at least some of the bins based on the training dataset. The best classifiers may be selected, and the bin scores for those classifiers may be determined as described further herein. This process may be repeated for the other sets until all defects are processed this way.

The method further includes assigning a rank to the one or more bins in the two or more defect classifiers based on the determined one or more characteristics. In this manner, the analysis of the defect classifiers described above that results in the one or more determined characteristics of the one or more bins may be used to rank the one or more bins. In particular, the analysis described above of all of the classifiers can be used to arrive at a ranking scheme for all bins of all classifiers executed on the training set. The output of the assigning step may be a ranking of all bins in the two or more defect classifiers. In some instances, user input may be used for parameterizing the ranking scheme (e.g., how much weight should be given to bin purity over bin stability, etc.). Assigning the rank may be performed in a number of different manners as described further herein.

Figure 2:
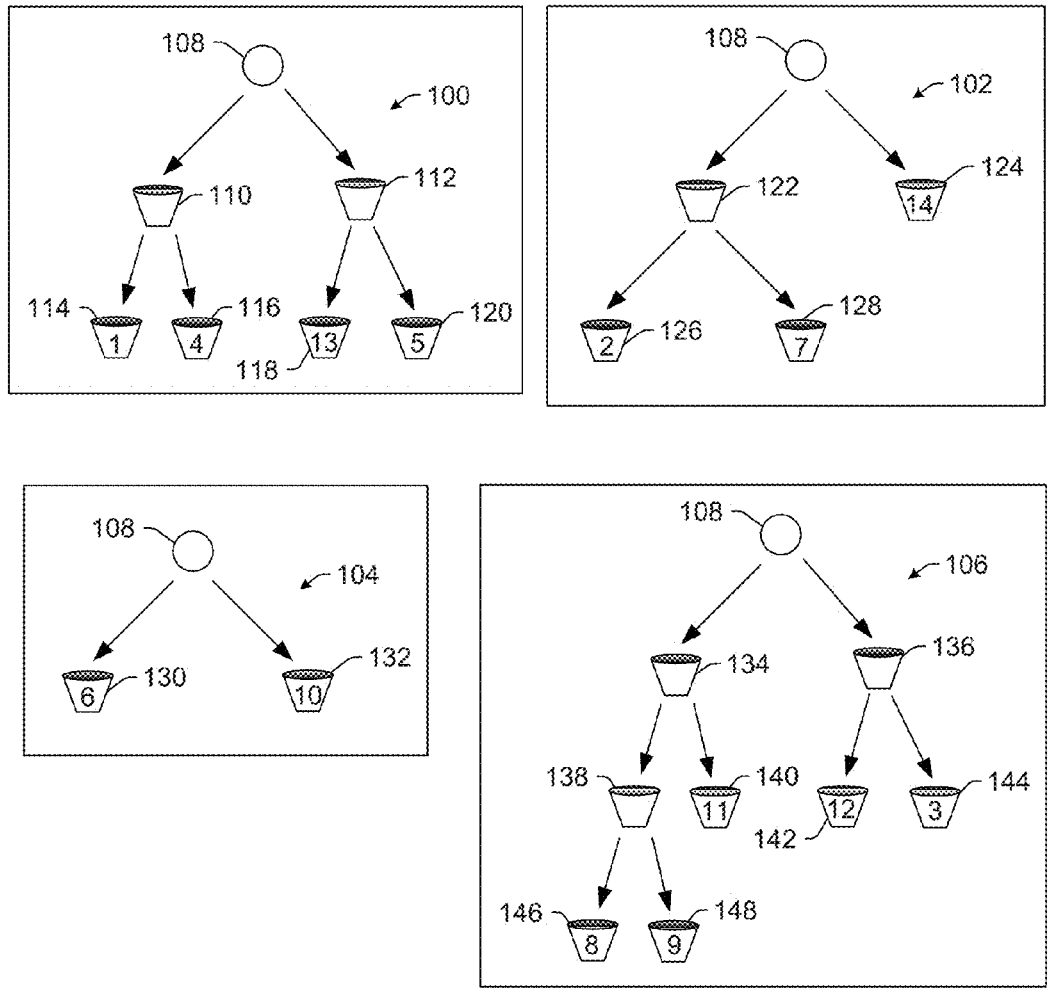
FIG. 2 is a schematic diagram illustrating one embodiment of the ranks that can be assigned to bins in the two or more defect classifiers shown in FIG. 1 by the embodiments described herein.

In one embodiment of results of the assigning step, as shown in FIG. 2, each of the bins produced by defect classifiers 100, 102, 104, and 106 may be assigned a rank from 1-14, as shown by the numbers on the bins in FIG. 2. These ranks may be assigned based on any of the characteristic(s) described further herein. As shown in FIG. 2, no two bins are assigned the same rank. In this manner, if a defect is separated into any of the two or more bins, the classification performed as described further herein can clearly arbitrate the final bin for the defect based on the ranking. For example, if a defect is assigned to two different bins corresponding to different defect classifications and if none of the bins have the same rank, then the two bins into which the defect has been separated will necessarily have different ranks thereby making arbitration of the final defect classification for the defect simpler. However, it is conceivable that some of the bins in one or more of the defect classifiers may be assigned the same rank, and a more complicated arbitration scheme could be used for situations in which a defect is assigned to two or more bins having the same rank (e.g., using a combination of rank determined by an embodiment described herein and user-assigned weightings). Although the ranks are shown in FIG. 2 as integers that are whole numbers, the ranks used in the embodiments described may have any suitable format. In addition, in contrast to simple scoring from, say, 0 to 100, this "hierarchical" ranking allows user input into which part of the scoring is more important. In other words, these schemes allow users to put weights on the frequently competing criteria to produce classifiers with different characteristics, e.g. more stability or more purity, etc.

As further shown in FIG. 2, all of the bins resulting from all of the defect classifiers have been ranked collectively against one another. Therefore, both DOI bins and nuisance bins have been ranked together and against each other. In this manner, the DOI bins have not been ranked against each other separately from the nuisance bins. For instance, since a defect may be classified into a DOI bin by one defect classifier and a nuisance bin by another defect classifier, if all of the possible (DOI and nuisance) bins have been ranked together, then the ranks of the DOI bin and nuisance bin for the one defect can be easily compared making the defect classification arbitration described herein as simple as possible.

In one embodiment, the one or more characteristics include purities of the defects in the training set assigned to the one or more bins in the two or more defect classifiers, and the rank assigned to the one or more bins is based on the purities such that higher ranks correspond to higher purities. The purities of the defects in a bin can be generally defined as some measure (e.g., number, ratio, percentage, etc.) of defects correctly assigned to the bin versus defects incorrectly assigned to the bin. For instance, the purity of a DOI bin may be determined based on the number of defects assigned to the bin that are the DOI type of the bin versus the number of defects assigned to the bin that are a different type of DOI or a nuisance. In one such example, the purity of a bin for bridging defects may be determined based on the number of bridging defects assigned to the bin versus the number of other non-bridging DOIs and nuisances assigned to the bin. In this manner, one bin for bridging defects that includes 99 bridging defects and 1 non-bridging defect is more pure than a different bin for bridging defects that includes 70 bridging defects and 30 non-bridging defects. The purity of nuisance bins can be determined in a similar manner. Once the purities for each bin being considered have been determined, the purities can be compared to each other to thereby determine the order of the bins from the most pure to the least pure, which can then be used to assign the ranks as described herein.

In another embodiment, the one or more characteristics include stabilities of the defects in the training set assigned to the one or more bins in the two or more defect classifiers, and the rank assigned to the one or more bins is based on the stabilities such that higher ranks correspond to higher stabilities. The stability of the detects in a training set assigned to a bin may be generally defined as a measure of a density of the defects in the bin proximate to the cutline(s) for the bin. In this manner, the stability may be an indication of how many defects have attributes that are relatively close to a cutline of the bin. For instance, relatively small, non-defect-related changes on a wafer (compared to the training wafer) can cause relatively small changes in one or more characteristics of defects (compared to the training set of defects) detected on the wafer that are used to classify the defects. Therefore, if a defect on the training wafer has a characteristic that is substantially close to a cutline of a bin, the relatively small changes in the defect characteristic(s) can cause the detect on the non-training wafer to be erroneously assigned to a different bin. As such the bin to which the defect on the non-training wafer should have been assigned is relatively instable to relatively small, non-defect-related changes on wafers. Consequently, defect bins that are more stable are "better" or more robust than defect bins that are less stable and the ranks described herein may be assigned to reflect those bin differences.

In an additional embodiment, the one or more characteristics include reliability of at least one of the two or more defect classifiers to separate the defects in the training set into the one or more bins correctly, and the rank assigned to the one or more bins is based on the reliability such that higher ranks correspond to higher reliabilities. In this manner, the most reliable and most discriminating portions of the trees can be identified. The reliability of the bins may be generally defined based on other characteristic(s) of the bins such as purity and stability described further herein. However, the reliability of the bins may be determined based on other characteristic(s) of the defects in the training set assigned to the bins such as accuracy, precision, etc. or any other characteristic that can be used to assess the performance of the defect classifier related to the individual bins. In this manner, the reliabilities of each of the bins in each of the defect classifiers can be compared to each other to determine the order of the bins from most reliable to least reliable, and the ranks can be assigned accordingly based on that order as described further herein.

As described herein, therefore, the rank of each bin may be assigned based on a variety of different characteristics of the bins. Regardless of the characteristics used in the embodiments described herein, the rank of each bin will always be a collective property of the defects of the type that match its label (e.g., a label as a DOI bin or a label as a nuisance bin). For example, if a bin is designated as a DOI bin, it will be the purity of the DOI population that will determine the purity characteristic(s) of the bin. For stability, such a bin will get a relatively high score if the DOIs in the bin are in some sense "far" from the cutline, and the nuisance population on the other side of the cutline, i.e., in the neighboring bin, is also "far" from the cutline.

With the development of this objective ranking scheme for all of the classifier bins and classification boundaries, it is then possible to identify a subset of classifiers that would achieve better classification results than any of the individual (constituent) classifiers alone. Although many systems and methods exist for auto-tuning decision tree classifiers, none of these systems and methods analyze and score the individual leaf nodes (bins) of the classifiers for purity, stability, etc. that could be used for a proposed combination of multiple classifiers as described herein. Instead, those existing systems and methods rely on simple voting criteria for arbitration (e.g. Random Forest approach).

The method includes selecting at least two of the two or more defect classifiers to be included in a composite defect classifier based on the rank assigned to the one or more bins. The selecting step may work with the training data and the ranking produced as described above. In other words, the classifiers whose bins have been ranked based on results produced using the training data may be passed to the selecting step. The best subset of the two or more defect classifiers may then be selected for use in the composite defect classifier described further herein. The concept of combining only the individual classifiers having the best classification regions into a better composite classifier as described herein is believed to be new in wafer inspection methodology. In addition, generating and selecting the individual classifiers as described herein is believed to be new in wafer inspection methodology. Furthermore, performing the selecting step based on the global bin ranking of individual classifiers on the training set as described herein is believed to be new. The output of the selecting step may be the selected subset of classifiers with their corresponding bin rankings.

The selecting step may be performed based on user input to allow flexibility in the selecting step (from manual to algorithmic). There may be, therefore, different levels of automation in identifying defect classifiers to be included in the composite defect classifier. For example, selection of defect classifiers from the set obtained during training can be made to automatically maximize some specific metric such as overall discriminability of particular DOI types from nuisance. Alternatively, the embodiments can simply make these metrics available to a user who can combine the classifiers manually.

Since the two or more defect classifiers used in the method may be different types of defect classifiers, the at least two selected defect classifiers may include different types of defect classifiers. For example, the selected defect classifiers may include decision tree type defect classifiers and/or nearest neighbor or linear (non-linear) discriminant classifiers that can be combined into a composite defect classifier that classifies all DOI types more reliably.

In one embodiment, the selecting step includes selecting a subset of the two or more defect classifiers that include the one or more bins assigned the highest rank for the largest set of DOIs in the training set of defects. In this manner, the subset of classifiers that classifies the largest set of DOIs most reliably (i.e., with the highest ranking) can be selected. Such a selecting step may be performed using any method and/or algorithm that maximizes the rank corresponding to the bins in which the known DOIs have been assigned while minimizing the number of selected defect classifiers. In this manner, the is simplest composite defect classifier that effectively classifies the most DOIs accurately can be generated.

In another embodiment, the rank is responsive to separation between DOIs in the training set and nuisances in the training set in the one or more bins of the two or more defect classifiers, and the selecting step includes selecting a minimum number of the two or more defect classifiers that produce maximum DOI separation based on the ranks assigned to the one or more bins The separation between DOIs may be generally defined as the ability of a classifier to assign all of the DOIs having a particular classification into the bin corresponding to that classification thereby separating the DOIs from other defects in the population. Therefore, the separation between DOIs may be determined, for example, based on the number, percentage, etc. of the total number of defects having a particular DOI type in the defect training set that have been assigned to the corresponding bin by a classifier. The bins may then be sorted in order from maximum DOI separation to minimum DOI separation. The ranks may then be assigned based on that order. In this manner, the selecting step may be performed to select the smallest subset of classifiers that would produce maximum DOI separation. Such a selecting step may be performed using any method and/or algorithm that maximizes the DOI separation while minimizing the number of selected defect classifiers. In this manner, the simplest composite defect classifier that maximizes the separation between DOIs can be generated.

Typically, most of the bins in the individual classifiers will be partially mixed (impure). Even if all defects of one DOI type are in one bin, it does not necessarily mean this would be a good bin, if there is also a substantial amount of nuisance in the same bin. On the other hand, a few of the bridging defects could end up in a bin with very little nuisance, while some others may end up in a bin that has a larger nuisance rate. In such an instance, the one bin with relatively high purity may be taken from one classifier, while another classifier that will separate the other defects of the same DOI type better may be searched for and then included in the composite defect classifier as described further herein. So the bin "goodness" really may be related to the purity (and stability) of the bin even when evaluating bins based on DOI separation.

Another point worth mentioning is that better DOI separation may be achieved by finding some bins that separate "well" some nuisance sub-population. By having this sub-population going reliably into a highly-ranked nuisance bin, we effectively improve the purity of all lower-ranked DOI bins where these nuisance defects may end up going in other classifiers. So the ranking of the bins may not only be based on finding good DOI separation, but can also be based on finding some bins where nuisance is reliably isolated.

in an additional embodiment, the method includes generating the composite defect classifier by storing information for the at least two selected defect classifiers with the rank assigned to the one or more bins included in the at least two selected defect classifiers. For example, the selected subset of classifiers can carry the ranking information from the training process on every bin. In addition, storing the information may include attaching information for the composite defect classifier to any inspection recipes in which it will be used. The ranks assigned to the bins in a classifier can be stored with other information for the classifier in any suitable manner and in any suitable storage medium, including those described further herein.

Figure 3:
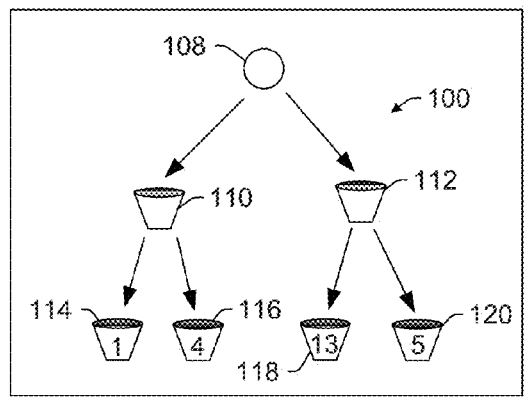
FIG. 3 is a schematic diagram illustrating one example of a subset of the two or more defect classifiers that can be selected to be included in a composite defect classifier according to the embodiments described herein.
Figure 3:
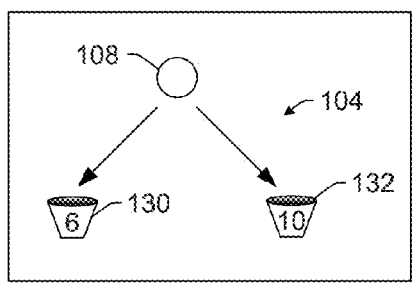
Figure 3:
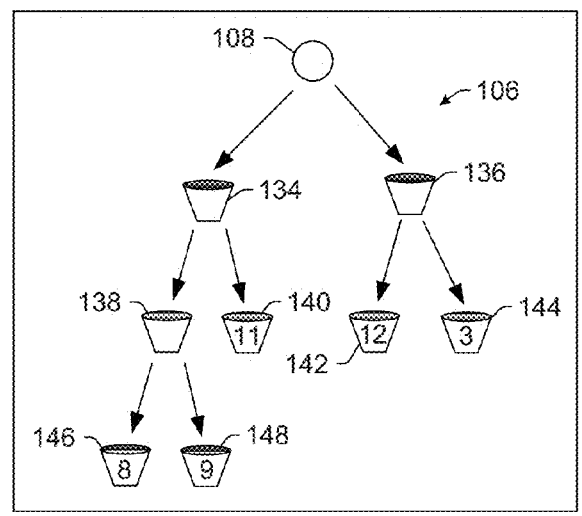

In one such example, as shown in FIG. 3, of the defect classifiers shown in FIGS. 1 and 2, only defect classifiers 100, 104, and 106 are selected to be included in the composite defect classifier. In this manner, defect classifier 102 shown in FIGS. 1 and 2 has not been selected to be included in the composite defect classifier, which includes only a subset of all of the defect classifiers that have been considered in the method. As further shown in FIG. 3, the rank that has been assigned to each of the bins in the selected defect classifiers may be retained and then that information may be stored with any and all of the information for the defect classifiers (e.g., defect classifier identifications, bin identifications, parameters such as cutlines, etc.). In this manner, the retained and stored rankings can be used as described further herein.

In a further embodiment, the method includes generating the composite defect classifier based on the at least two selected defect classifiers, and generating the composite defect classifier does not include altering any of the at least two selected defect classifiers. In some embodiments, the method includes generating the composite defect classifier based on the at least two selected defect classifiers, and generating the composite defect classifier does not include tuning any of the at least two selected defect classifiers. For example, the method may include classifier training (or tuning) that can be performed using the training set of data. In particular, results of the comparing step described herein (in which the defect classification results of a classifier are compared to the defect classifications determined for the defects in the training set) may be used to alter one or more parameters of the classifier such that the defect classification results produced by the classifier match the predetermined defect classifications as closely as possible thereby tuning the classifier. As such, the one or more characteristics that are determined for the bins in the classifiers as described herein may be one or more characteristics of one or more bins in two or more tuned defect classifiers. In addition, other steps of the method would be performed using the tuned classifiers. As such, after the at least two defect classifiers are selected, the composite defect classifier can be generated based on the selected defect classifiers without performing any additional tuning on the classifiers.

In yet another embodiment, the method includes generating the composite defect classifier based on the at least two selected defect classifiers, and generating the composite defect classifiers does not include combining the at least two selected defect classifiers into a sequence of defect classifiers. For example, as described further herein, the composite defect classifier includes the at least two selected defect classifiers, but including the selected defect classifiers in the composite defect classifier does not include altering or modifying the individual selected defect classifiers. Therefore, the trees are not modified to change the input of the individual classifiers from the defect population detected on a wafer and to be classified to the output of another of the individual classifiers. In other words, in the composite defect classifier, the individual classifiers are not arranged such that the output of one classifier is input to another classifier. Therefore, generating a composite defect classifier is not equivalent to combining relatively small decision trees into one single larger decision tree into which the defect population to be classified is input only once and in which a defect is assigned to only one bin.

The embodiments described herein are therefore different from other currently used defect classifiers and other currently used methods for generating defect classifiers. For example, it is believed that a combination of classifiers such as that described herein has not yet been attempted in a wafer inspection process. The only somewhat similar capability is the sequencing of multiple nuisance filters during a production scan. However, in this flow, the filtering is purely based on sequential execution of filters, and more complicated combiner rules are not used. The sequenced nuisance filters are substantially powerful as each filter can be tuned to filter out a specific nuisance source, but the embodiments described herein would also allow identifying trends that human experts might miss and the embodiments can be applied to binning as well.

Some other currently used methods for generating defect classifiers are based on "Random Forest" classification. This is an "ensemble" method where a large number of trees are created randomly—attributes are selected randomly at each node of every decision tree—and the trees are typically built without pruning until all the bins are pure. The label on each bin is determined by the type of the defects in the training set that land in that bin. All the trees are then used during classification, and each defect obtains a label based on simple voting, if most trees classify a defect as being of type A, then the defect will be classified as type A.

The approaches described herein are very different from Random Forest classifiers. There are at least four fundamental differences. For example, in the embodiments described herein, the individual trees are constructed only to fixed depth, and usually terminate even earlier due to requirements on some minimal improvement in discrimination from one level to next. As a consequence, the bins in the candidate classifiers used in the embodiments described herein are typically not pure unlike in Random Forest classification. In another example, the way the "forest" or set of candidate trees used in the embodiments described herein is generated is different. In particular, the primary method of creating the forest of candidate trees used in the embodiments described herein may be based on generating a solution with modified Bayesian priors, i.e. varied discrimination thresholds. In an additional example, the way a subset of trees from this forest is selected for classification as described in various places herein, e.g., only trees necessary to classify all defects with the highest possible scored bin, is different from the Random Forest classifiers described above. In a further example, the arbitration scheme for classification used in the embodiments described herein is different as described extensively herein.

In contrast, the embodiments described herein can be used to not only analyze the reliability of individual classification boundaries and identify the purest and most stable bins of each classifier, the embodiments also provide: (a) a method for identifying a subset of the most compatible classifiers from a given set (based on the bin ranking information) for identifying a set of the most compatible classifiers, and (b) combining method(s) based on bin ranking.

The method includes acquiring inspection results for the wafer using an inspection system. The inspection results include information for defects detected on the wafer. A user may select the inspection results file to be used in the method. The inspection results may include information about the defects detected on the wafer such as the locations of the defects detected on the wafer and any other information for the defects detected on the wafer such as defect attributes determined for the defects and image data or images generated for the defects. Acquiring the inspection results may include scanning the wafer with the inspection system. In other words, acquiring the inspection results may include performing a wafer inspection process on a wafer with an inspection system to thereby detect defects on the wafer and generate information for the defects. However, acquiring the inspection results may include acquiring the inspection results from a storage medium in which the inspection results have been stored by the inspection system.

The method further includes classifying the defects detected on the wafer by inputting the information for the defects detected on the wafer into each of the at least two defect classifiers selected to be included in the composite defect classifier and, for at least one of the defects that is assigned to two or more bins in the composite defect classifier, determining a bin for the at least one of the defects based on the rank assigned to the two or more bins. Therefore, the method includes a classifier execution step, which may be performed by a classifier execution engine. The classifying step may process all defects with all of the defect classifiers included in the composite defect classifier. In this manner, on production wafers, all of the classifiers in the composite defect classifier may be executed, and the most reliable classification for each defect can be determined. The defects can then be assigned to the corresponding bins.

In some embodiments, for the at least one of the defects that is assigned to the two or more bins in the composite defect classifier, determining the bin for the at least one of the defects based on the rank assigned to the two or more bins includes comparing the rank of the two or more bins and assigning the at least one of the defects to one of the two or more bins having the highest rank. In this manner, the classification can be assigned to each defect by arbitrating the partial results based on the highest ranked bin the defect was part of. In this manner, the classification for a defect may be determined based on the ranking of various classifications assigned to the defect to thereby produce the final classification. During execution, the number of bins to which each defect is assigned should be equal to the number of individual classifiers in the composite classifier.

Figure 4:
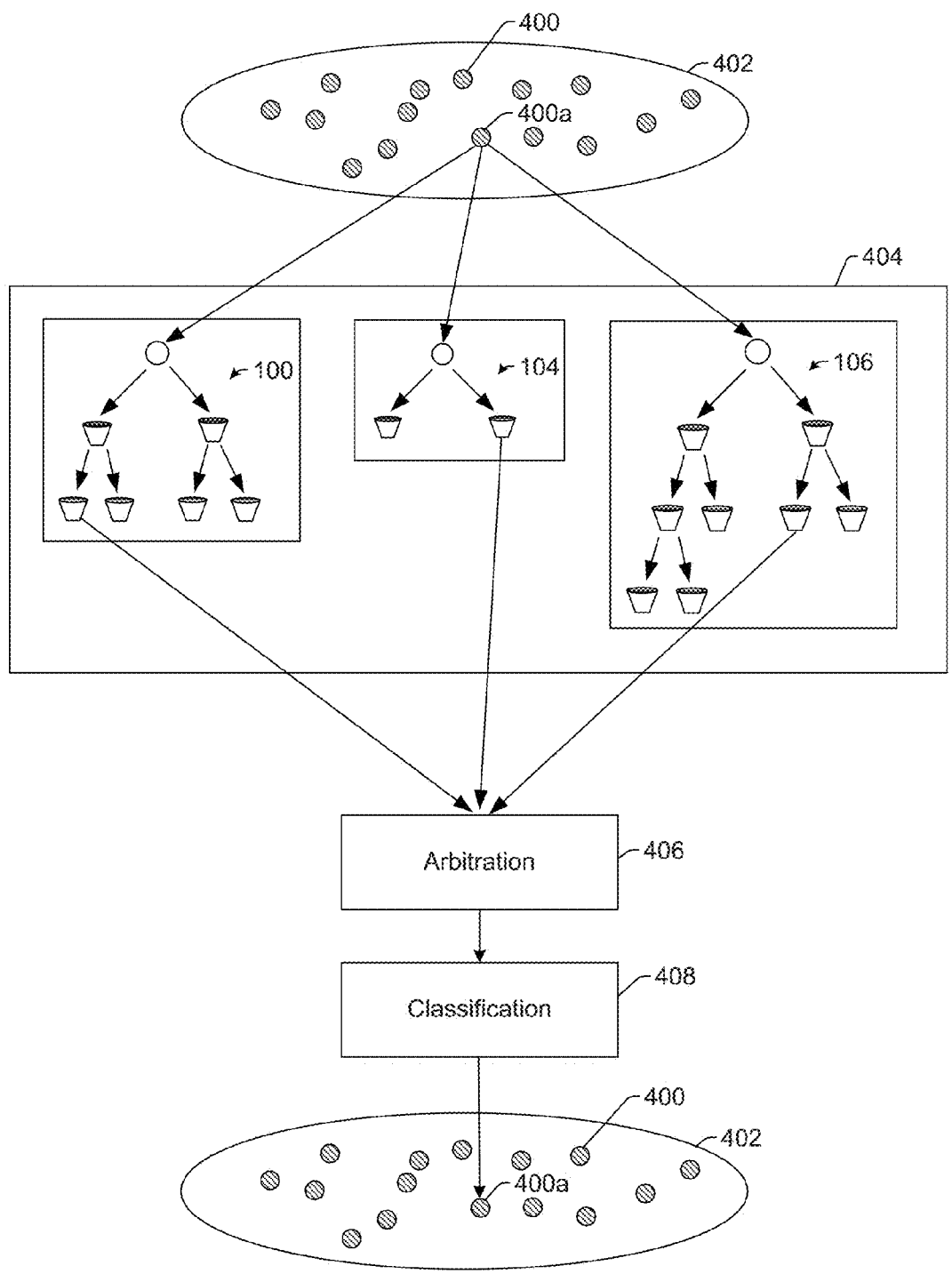
FIG. 4 is a schematic diagram illustrating one embodiment of steps that may be performed to classify defects using the composite defect classifier embodiments described herein.

In one such embodiment, as shown in FIG. 4, the inspection results for the wafer include information for defects 400 detected on wafer 402. The defects are merely shown in this figure to further understanding of the classification step and are not meant to illustrate any particular defects that could be detected on a wafer and classified as described herein. For example, the embodiments described herein are not limited in the types of defects that can be classified or the types of wafers for which the embodiments could be used.

Composite defect classifier 404 shown in this figure includes defect classifiers 100, 104, and 106 that were selected as described above in the example of FIG. 3 to be included in the composite defect classifier. After the inspection results have been acquired for wafer 402, all of the defects detected on the wafer and to be classified will be input to each of defect classifiers 100, 104, and 106 included in the composite defect classifier. If the defect classifiers can be executed simultaneously, then all of the defect classifiers can be run in parallel. However, if the defect classifiers cannot all be executed at the same time for whatever reason (e.g., available computing resources), then the defect classifiers can be executed serially. In either case, however, the input to each of the defect classifiers will be exactly the same (i.e., the same population of defects detected on the wafer and to be classified). In this manner, the results of one defect classifier are not input to another defect classifier, as would be the case if the defect classifiers were configured in a sequence of defect classifiers.

The classification process will now be described with respect to a single defect on the wafer, but it is to be understood that this classification can be performed for any and all of the defects detected on the wafer. In particular, as shown in FIG. 4, information for defect 400a is input to all of defect classifiers 100, 104, and 106. Each of the defect classifiers assigns the defect to a bin. Therefore, defect 400a has been assigned to three different bins. The ranks assigned to those three different bins according to the embodiments described herein may then be sent to arbitration step 406, which, in the simplest implementation, includes comparing all of the ranks of all of the bins to which the defect has been assigned and determining the classification of the defect as the classification corresponding to the bin having the highest rank. Output of the arbitration step may, therefore, include classification 408, which can then be assigned to defect 400a. The classifications determined in this manner can then be stored and used in the same way that any other defect classifications are stored and used.

In some embodiments, the arbitration step may be performed for any defect regardless of the classifications corresponding to the bins in which the defect has been assigned. However, in some instances, the arbitration step may include comparing the classifications corresponding to the bins in which a defect has been assigned. If all of the classifications corresponding to all of the bins to which a defect has been assigned are the same, then the arbitration may include simply assigning that classification to the defect without comparing the ranks of the bins. However, if any two or more bins to which a defect has been assigned have different corresponding classifications, then the arbitration may involve comparing the ranks as described above.

The embodiments described herein, therefore, involve ranking of bins of the two or more defect classifiers (e.g., from the purist and most stable to the least pure and least stable) and classifying defects based on the highest ranked bin. Such an approach may be particularly useful for CART-type classifiers. Other combiner rules that may be applicable to other types of classifiers can also be developed and used in the embodiments described herein. For example, the combiner rules may include fixed rules based on (a) AND, (b) OR, (c) majority vote, (d) k out of N classifiers, or (e) Borda count for DOIs. Another possible method is one based on voting that is weighted by the bin score. This is a compromise between simple majority voting and classifying based on the highest scored bin, in another example, the combiner rules may include a Bayesian combiner that relies on the ability to estimate posterior probabilities of the individual classifiers and minimizing the Bayesian error (or risk). In an additional example, the combiner rules may be trainable combiners in which the combination of individual classifiers can itself be treated as part of the classifier training process using training and verification datasets. Furthermore, the combiner rules may be a bagging method that is related to combiner training, in which bootstrap aggregation is used to generate larger (random) datasets for studying the classifier stability. In addition, the combiner rules may include a boosting procedure that generates classifiers and training sets sequentially. In this method, classification results from one classifier may become input datasets fir the next classifier and so on. This method concentrates on weaker classification of the preceding classifiers and thus strengthens the classification results. In a further example, the combiner rules may include AdaBoost, which is a procedure that forms a linear combination of weak classifiers to produce a better, more complex classifier. Combination rules can also be constructed manually by users with computer-assisted ranking of the user-defined constructs. Such approaches have the strength of combining human decision making capabilities with machine-based objective ranking. Therefore, the embodiments described herein may use a variety of combination approaches (training vs. fixed, etc.).

As described above, the composite defect classifier may be generated before a wafer inspection process (e.g., a production scan) and then used for multiple wafers of the same type. The composite defect classifier may also be modified periodically after use of the composite defect classifier has begun. An inspection process that is to be used for updating the composite defect classifier may be performed in the same manner that any other inspection process using the composite defect classifier is performed except for that any nuisance filter of the inspection process may be turned off and/or information for defects assigned to nuisance bins may be saved. Therefore, after the inspection process, information for both defects determined to be DOIs and defects determined to be nuisances can be examined further in some manner (e.g., using a scanning electron microscope (SEM) defect review tool) to determine the "true" classification for the defects. Any defects determined to be assigned the incorrect classification by the composite defect classifier can be used to determine if one or more parameters of the composite defect classifier can be modified to reduce the number of defects incorrectly classified. Those parameters include any parameters of the composite defect classifier itself as well as any parameters of the arbitration step described herein.

The acquiring the training set step, the performing step, the comparing step, the determining step, the assigning step, the selecting step, the acquiring the inspection results step, and the classifying step described above are performed by a computer system, which may be configured as described herein.

Each of the embodiments of the method described above may include any other step(s) of any other method(s) described herein. Furthermore, each of the embodiments of the method described above may be performed by any of the systems described herein.

Another embodiment relates to a different computer-implemented method for classifying defects detected on a wafer. The method includes acquiring inspection results for the wafer using an inspection system, which may be performed according to any of the embodiments described herein. The inspection results include information for defects detected on the wafer, and the information may include any such information described herein.

The method also includes classifying the defects detected on the wafer by inputting the information for the defects detected on the wafer into each of at least two defect classifiers included in a composite defect classifier, which may be performed according to any of the embodiments described herein. Classifying the defects also includes, for at least one of the defects that is assigned to two or more bins in the composite defect classifier, determining a bin for the at least one of the defects based on a rank assigned to the two or more bins, which may be performed as described further herein. The rank is assigned to the two or more bins based on one or more characteristics determined for the two or more bins, which may be performed according to any of the embodiments described herein. The one or more characteristics are determined based on a comparison of predetermined defect classifications for defects in a training set and defect classifications determined for the defects in the training set by the at least two defect classifiers, which may be performed according to any of the embodiments described herein.

The additional method described above does not, therefore, necessarily include generating the composite defect classifier. Instead, the composite defect classifier may be generated by another method or system including any of those described herein. Therefore, this additional method may be that which is used for classifying defects detected on non-training wafers (e.g., production wafers) after the inspection process (including the composite defect classifier) has been setup. Therefore, the methods described herein can include only setup of the composite defect classifier, only classification performed using the composite defect classifier, or both setup and execution of the composite defect classifier.

The acquiring and classifying steps described above are performed by a computer system, which may be configured as described herein.

Each of the embodiments of the method described above may include any other step(s) of any other method(s) described herein. Furthermore, each of the embodiments of the method described above may be performed by any of the systems described herein.

All of the methods described herein may include storing results of one or more steps of the method embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc.

Figure 5:
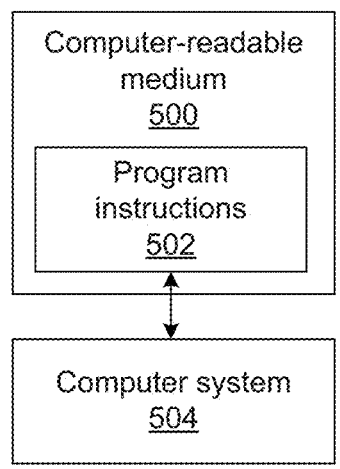
FIG. 5 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing a computer-implemented method for classifying defects detected on a wafer. One such embodiment is shown in FIG. 5. In particular, as shown in FIG. 5, computer-readable medium 500 includes program instructions 502 executable on computer system 504. The computer-implemented method includes the steps of the method described above. The computer-implemented method for which the program instructions are executable may include any other step(s) described herein.

Program instructions 502 implementing methods such as those described herein may be stored on computer-readable medium 500. The computer-readable medium may be a storage medium such as a magnetic or optical disk, or a magnetic tape or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), or other technologies or methodologies, as desired.

The computer system may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system may also include any suitable processor known in the art such as a parallel processor. In addition, the computer system may include a computer platform with high speed processing and software, either as a standalone or a networked tool.

Figure 6:
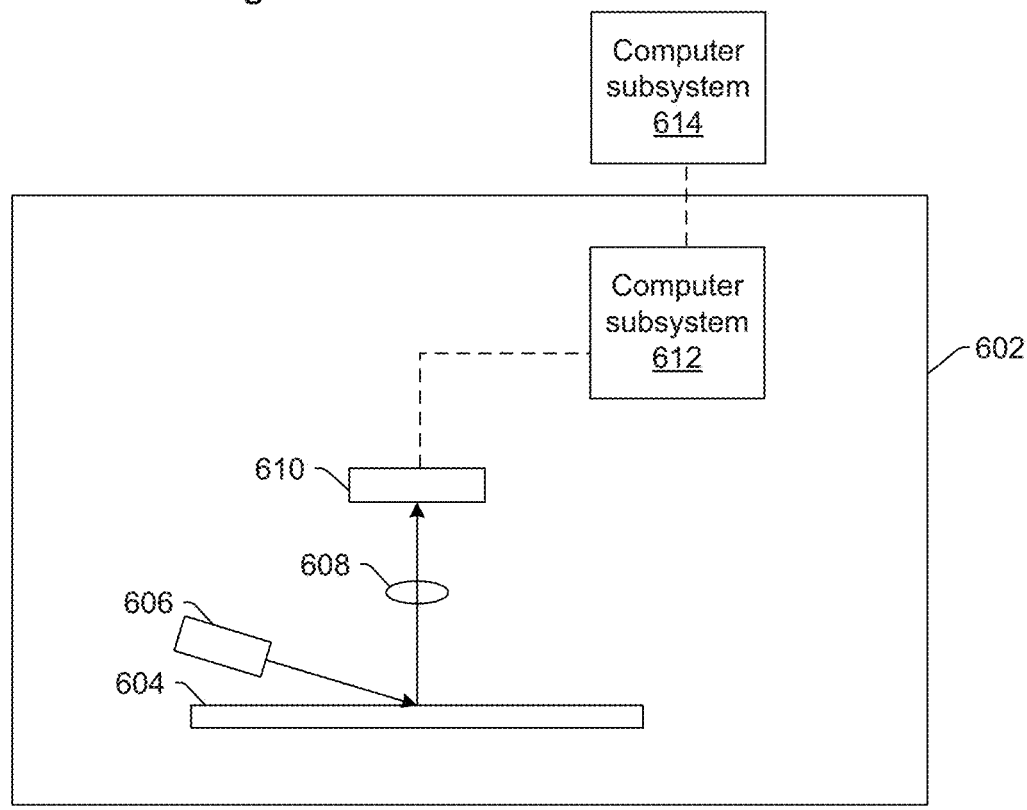
FIG. 6 is a schematic diagram illustrating a side view of one embodiment of a system configured to classify defects detected on a wafer.

An additional embodiment relates to a system configured to classify defects detected on a wafer. One embodiment of such a system is shown in FIG. 6. The system includes inspection subsystem 602 configured to acquire inspection results for wafer 604. The inspection results include information for defects detected on the wafer, which may include any such information described herein.

The inspection subsystem includes source 606 that may include any suitable light source such as a laser in the case of an optical or light-based inspection subsystem. Although the inspection subsystem will be described further herein with respect to a light-based inspection subsystem, the inspection subsystem may be modified in any suitable manner or replaced to make it an electron beam-based inspection subsystem.

Light from the light source is directed to wafer 604. The light source may be coupled to any other suitable elements (not shown) such as one or more condensing lenses, collimating lenses, relay lenses, objective lenses, apertures, spectral filters, polarizing components and the like. As shown in FIG. 6, the light may be directed to the wafer at an oblique angle of incidence. However, the light may be directed to the wafer at any suitable angle of incidence including near normal and normal incidence. In addition, the light or multiple light beams may be directed to the wafer at more than one angle of incidence sequentially or simultaneously.

Wafer 604 may disposed upon a stage (not shown) while the light is being directed to the wafer. The stage may include any suitable mechanical or robotic assembly and may be configured to move the wafer in one or more directions while the light is being directed to the wafer such that the light can be scanned over the wafer by the inspection subsystem. However, the inspection subsystem may be configured to scan the light over the wafer in any other suitable manner.

The inspection subsystem also includes collector 608 configured to collect light scattered from the wafer (in the case of a dark field capable inspection system), which is configured to direct the collected light to detector 610 that is configured to detect the light scattered from the wafer that is collected by the collector. The collector may include any suitable number and configuration of reflective and/or refractive optical elements. Detector 610 may include any suitable detector. Detector 610 and collector 608 may therefore form at least a portion of a detection subsystem of the inspection subsystem. The detection subsystem may include one or more other suitable elements (not shown) positioned in the optical path between the detector and the wafer such as objective lenses, relay lenses, magnification lenses, zooming lenses, apertures, spectral filters, gratings, and polarizing components. Although the inspection subsystem is shown in FIG. 6 to detect light scattered from the wafer, the inspection subsystem may also or alternatively be configured for bright field (BF) inspection of the wafer. The inspection subsystem may also include more than one detector (not shown), which may be used to detect different light from the wafer simultaneously or sequentially.

The inspection subsystem may include computer subsystem 612 configured to generate the inspection results described herein. For example, computer subsystem 612 may be coupled to detector 610 by one or more transmission media (not shown), which may include "wired" and/or "wireless" transmission media such that the computer subsystem can receive the output of the detector. The computer subsystem may then use the output to detect defects on the wafer as described herein and to determine any of the information described herein for the defects. Information generated by computer subsystem 612 may then be output by the computer subsystem in the form of an inspection results file as described further herein.

The inspection subsystem may include one computer subsystem that is configured to detect the defects on the wafer, and the system may include another, different computer subsystem that is configured to perform the steps of the methods described herein. For example, the system may include computer subsystem 614 that may be coupled to computer subsystem 612 as described above such that computer subsystem 614 can receive the inspection results from computer subsystem 612. Computer subsystem 614 is configured for performing the acquiring the training set step, the performing step, the comparing step, the determining step, the assigning step, the selecting step, and the classifying step described herein, which may be performed as described herein. The computer subsystem and the system may be configured to perform any other step(s) described herein and may be further configured as described herein. In addition, the system may include only one computer subsystem (e.g., only computer subsystem 612) that is configured to perform all of the step(s) described herein. This may be the case when an inspection tool is configured to perform the method embodiments described herein. For example, the inspection subsystem shown in FIG. 6 may be configured as an inspection tool that both detects defects on the wafer and classifies the defects as described herein.

It is noted that FIG. 6 is provided herein to generally illustrate one configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the Puma 90xx, 91xx, and 93xx series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Further modifications and alternative embodiments of various aspects of the invention will be apparent to those skilled in the art in view of this description. For example, methods and systems for classifying defects detected on a wafer are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention ma be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for classifying defects detected on a wafer, comprising:

acquiring a training set of data for defects detected on a training wafer and defect classifications determined for the defects in the training set;

performing two or more defect classification processes by inputting the training set of data into two or more defect classifiers;

comparing defect classification results produced by the two or more defect classifiers to the defect classifications determined for the defects in the training set;

determining one or more characteristics of one or more bins in the two or more defect classifiers based on results of said comparing;

assigning a rank to the one or more bins in the two or more defect classifiers based on the determined one or more characteristics;

selecting at least two of the two or more defect classifiers to be included in a composite defect classifier based on the rank assigned to the one or more bins;

acquiring inspection results for the wafer using an inspection system, wherein the inspection results comprise information for defects detected on the wafer; and classifying the defects detected on the wafer by inputting the information for the defects detected on the wafer into each of the at least two defect classifiers selected to be included in the composite defect classifier and, for at least one of the defects that is assigned to two or more bins in the composite defect classifier, determining a bin for the at least one of the defects based on the rank assigned to the two or more bins, wherein said acquiring the training set, said performing, said comparing, said determining, said assigning, said selecting, said acquiring the inspection results, and said classifying are performed by a computer system.

2. The method of claim 1, wherein the defects in the training set comprise defects of interest and nuisances.

3. The method of claim 1, wherein said performing comprises tuning the two or more defect classifiers based on the defect classifications determined for the defects in the training set.

4. The method of claim 1, further comprising tuning at least one of the two or more defect classifiers prior to said assigning using a set of modified Bayesian priors to produce a plot illustrating performance of the at least one defect classifier.

5. The method of claim 1, wherein the one or more characteristics comprise purities of the defects in the training set assigned to the one or more bins in the two or more defect classifiers, and wherein the rank assigned to the one or more bins is based on the purities such that higher ranks correspond to higher purities.

6. The method of claim 1, wherein the one or more characteristics comprise stabilities of the defects in the training set assigned to the one or more bins in the two or more defect classifiers, and wherein the rank assigned to the one or more bins is based on the stabilities such that higher ranks correspond to higher stabilities.

7. The method of claim 1, wherein the one or more characteristics comprise reliability of at least one of the two or more defect classifiers to separate the defects in the training set into the one or more bins correctly, and wherein the rank assigned to the one or more bins is based on the reliability such that higher ranks correspond to higher reliabilities.

8. The method of claim 1, wherein said selecting comprises selecting a subset of the two or more defect classifiers that include the one or more bins assigned the highest rank for the largest set of defects of interest in the training set of defects.

9. The method of claim 1, wherein the rank is responsive to separation between defects of interest in the training set and nuisances in the training set in the one or more bins of the two or more defect classifiers, and wherein said selecting comprises selecting a minimum number of the two or more defect classifiers that produce maximum defect of interest separation based on the ranks assigned to the one or more bins.

10. The method of claim 1, further comprising generating the composite defect classifier by storing information for the at least two selected defect classifiers with the rank assigned to the one or more bins included in the at least two selected defect classifiers.

11. The method of claim 1, further comprising generating the composite defect classifier based on the at least two selected defect classifiers, wherein generating the composite defect classifier does not comprise altering any of the at least two selected defect classifiers.

12. The method of claim 1, further comprising generating the composite defect classifier based on the at least two selected defect classifiers, wherein generating the composite defect classifier does not comprise tuning any of the at least two selected defect classifiers.

13. The method of claim 1, further comprising generating the composite defect classifier based on the at least two selected defect classifiers, wherein generating the composite defect classifier does not comprise combining the at least two selected defect classifiers into a sequence of defect classifiers.

14. The method of claim 1, wherein, for the at least one of the defects that is assigned to the two or more bins in the composite defect classifier, determining the bin for the at least one of the defects based on the rank assigned to the two or more bins comprises comparing the rank of the two or more bins and assigning the at least one of the defects to one of the two or more bins having the highest rank.

15. A computer-implemented method for classifying defects detected on a wafer, comprising:

acquiring inspection results for the wafer using an inspection system, wherein the inspection results comprise information for defects detected on the wafer; and classifying the defects detected on the wafer by:
inputting the information for the defects detected on the wafer into each of at least two defect classifiers included in a composite defect classifier; and for at least one of the defects that is assigned to two or more bins in the composite defect classifier, determining a bin for the at least one of the defects based on a rank assigned to the two or more bins;

wherein the rank is assigned to the two or more bins based on one or more characteristics determined for the two or more bins, wherein the one or more characteristics are determined based on a comparison of predetermined defect classifications for defects in a training set and defect classifications determined for the defects in the training set by the at least two defect classifiers, and wherein said acquiring and said classifying are performed by a computer system.

16. A non-transitory computer-readable medium, storing program instructions executable on a computer system for performing a computer-implemented method for classifying defects detected on a wafer, wherein the computer-implemented method comprises:

acquiring a training set of data for defects detected on a training wafer and defect classifications determined for the defects in the training set;

performing two or more defect classification processes by inputting the training set of data into two or more defect classifiers;

comparing defect classification results produced by the two or more defect classifiers to the defect classifications determined for the defects in the training set;

determining one or more characteristics of one or more bins in the two or more defect classifiers based on results of said comparing;

assigning a rank to the one or more bins in the two or more defect classifiers based on the determined one or more characteristics;

selecting at least two of the two or more defect classifiers to be included in a composite defect classifier based on the rank assigned to the one or more bins;

acquiring inspection results for the wafer using an inspection system, wherein the inspection results comprise information for defects detected on the wafer; and classifying the defects detected on the wafer by inputting the information for the defects detected on the wafer into each of the at least two defect classifiers selected to be included in the composite defect classifier and, for at least one of the defects that is assigned to two or more bins in the composite defect classifier, determining a bin for the at least one of the defects based on the rank assigned to the two or more bins.

17. A system configured to classify defects detected on a wafer, comprising:

an inspection subsystem configured to acquire inspection results for the wafer, wherein the inspection results comprise information for defects detected on the wafer; and a computer subsystem configured for:
acquiring a training set of data for defects detected on a training wafer and defect classifications determined for the defects in the training set;
performing two or more defect classification processes by inputting the training set of data into two or more defect classifiers;
comparing defect classification results produced by the two or more defect classifiers to the defect classifications determined for the defects in the training set;
determining one or more characteristics of one or more bins in the two or more defect classifiers based on results of said comparing;
assigning a rank to the one or more bins in the two or more defect classifiers based on the determined one or more characteristics;
selecting at least two of the two or more defect classifiers to be included in a composite defect classifier based on the rank assigned to the one or more bins; and
classifying the defects detected on the wafer by inputting the information for the defects detected on the wafer into each of the at least two defect classifiers selected to be included in the composite defect classifier and, for at least one of the defects that is assigned to two or more bins in the composite defect classifier, determining a bin for the at least one of the defects based on the rank assigned to the two or more bins.

18. The system of claim 17, wherein the defects in the training set comprise defects of interest and nuisances.

19. The system of claim 17, wherein said performing comprises tuning the two or more defect classifiers based on the defect classifications determined for the defects in the training set.

20. The system of claim 17, wherein the computer subs stem is further configured for tuning at least one of the two or more defect classifiers prior to said assigning using a set of modified Bayesian priors to produce a plot illustrating performance of the at least one defect classifier.

21. The system of claim 17, wherein the one or more characteristics comprise purities of the defects in the training set assigned to the one or more bins in the two or more defect classifiers, and wherein the rank assigned to the one or more bins is based on the purities such that higher ranks correspond to higher purities.

22. The system of claim 17, wherein the one or more characteristics comprise stabilities of the defects in the training set assigned to the one or more bins in the two or more defect classifiers, and wherein the rank assigned to the one or more bins is based on the stabilities such that higher ranks correspond to higher stabilities.

23. The system of claim 17, wherein the one or more characteristics comprise is reliability of at least one of the two or more defect classifiers to separate the defects in the training set into the one or more bins correctly, and wherein the rank assigned to the one or more bins is based on the reliability such that higher ranks correspond to higher reliabilities.

24. The system of claim 17, wherein said selecting comprises selecting a subset of the two or more defect classifiers that include the one or more bins assigned the highest rank for the largest set of defects of interest in the training set of defects.

25. The system of claim 17, wherein the rank is responsive to separation between defects of interest in the training set and nuisances in the training set in the one or more bins of the two or more defect classifiers, and wherein said selecting comprises selecting a minimum number of the two or more defect classifiers that produce maximum defect of interest separation based on the ranks assigned to the one or more bins.

26. The system of claim 17, wherein the computer subsystem is further configured fir generating the composite defect classifier by storing information for the at least two selected defect classifiers with the rank assigned to the one or more bins included in the at least two selected defect classifiers.

27. The system of claim 17, wherein the computer subsystem is further configured for generating the composite defect classifier based on the at least two selected defect classifiers, and wherein generating the composite defect classifier does not comprise altering any of the at least two selected defect classifiers.

28. The system of claim 17, wherein the computer subsystem is further configured for generating the composite defect classifier based on the at least two selected defect classifiers, and wherein generating the composite defect classifier does not comprise tuning any of the at least two selected defect classifiers.

29. The system of claim 17, wherein the computer subsystem is further configured for generating the composite defect classifier based on the at least two selected defect classifiers, and wherein generating the composite defect classifier does not comprise combining the at least two selected defect classifiers into a sequence of defect classifiers.

30. The system of claim 17, wherein, for the at least one of the defects that is assigned to the two or more bins in the composite defect classifier, determining the bin for the at least one of the defects based on the rank assigned to the two or more bins comprises comparing the rank of the two or more bins and assigning the at least one of the defects to one of the two or more bins having the highest rank.

* * * * *